US011300200B2

(12) United States Patent
Fox et al.

(10) Patent No.: US 11,300,200 B2
(45) Date of Patent: Apr. 12, 2022

(54) HYDRAULIC CONTROL UNIT WITH EXTERNALLY MOUNTED PUMP

(71) Applicant: Eaton Intelligent Power Limited, Dublin (IE)

(72) Inventors: Matthew G Fox, Ceresco, MI (US); Jeffrey A Oesch, Marshall, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/049,317

(22) PCT Filed: Apr. 17, 2019

(86) PCT No.: PCT/EP2019/025111
§ 371 (c)(1),
(2) Date: Oct. 20, 2020

(87) PCT Pub. No.: WO2019/201477
PCT Pub. Date: Oct. 24, 2019

(65) Prior Publication Data
US 2021/0054925 A1    Feb. 25, 2021

Related U.S. Application Data

(60) Provisional application No. 62/699,125, filed on Jul. 17, 2018, provisional application No. 62/660,913, filed on Apr. 20, 2018.

(51) Int. Cl.
*F16H 61/00* (2006.01)
*F16H 61/02* (2006.01)
*F16H 48/20* (2012.01)

(52) U.S. Cl.
CPC ..... *F16H 61/0031* (2013.01); *F16H 61/0206* (2013.01); *F16H 2048/204* (2013.01); *F16H 2061/0034* (2013.01)

(58) Field of Classification Search
CPC ............ F16H 61/0031; F16H 61/0206; F16H 2048/204; F16H 2061/0034; F16H 2061/308; F16H 61/0021
See application file for complete search history.

(56) References Cited

U.S. PATENT DOCUMENTS

| 10,655,720 B2 | 5/2020 | Hillman et al. | |
| 2005/0167228 A1* | 8/2005 | Baxter | F16H 48/22 192/49 |

(Continued)

FOREIGN PATENT DOCUMENTS

| CN | 107636358 A | 1/2018 |
| EP | 1559931 A2 | 8/2005 |
| WO | WO-2018/013966 A1 | 1/2018 |

OTHER PUBLICATIONS

International Search Report and Written Opinion for PCT/EP2019/025111, dated Aug. 5, 2019; pp. 1-15.

*Primary Examiner* — David J Hlavka
(74) *Attorney, Agent, or Firm* — Mei & Mark, LLP

(57) ABSTRACT

A hydraulic control unit comprising a central accumulator, a flow path connected to the accumulator, a reservoir sharing a fluid space with the accumulator, a pump, and a controllable valve. The flow path is integrally formed to comprise a first flow path and a second flow path. The pump is connected to the accumulator via the first flow path on a first side of the accumulator. The pump is further connected to the reservoir via an inlet flow path on the first side of the accumulator. The controllable valve is connected to the accumulator via the second flow path on a second side of the accumulator.

18 Claims, 7 Drawing Sheets

(56) References Cited

U.S. PATENT DOCUMENTS

| | | | |
|---|---|---|---|
| 2010/0311538 A1* | 12/2010 | Miyabe | F16H 61/0031 |
| | | | 477/2 |
| 2013/0263948 A1 | 10/2013 | Ruediger et al. | |
| 2017/0045127 A1* | 2/2017 | Fisher | F16H 57/037 |
| 2017/0306988 A1* | 10/2017 | Guo | F16H 57/0436 |
| 2018/0023701 A1* | 1/2018 | Shin | F16H 61/688 |
| | | | 60/413 |
| 2018/0073617 A1 | 3/2018 | Hillman et al. | |
| 2018/0363681 A1 | 12/2018 | Fox | |
| 2019/0143811 A1 | 5/2019 | Edler et al. | |

* cited by examiner

HYDRAULIC CONTROL UNIT WITH EXTERNALLY MOUNTED PUMP

This is a § 371 National Stage entry which claims the benefit of priority of Patent Cooperation Treaty Application No. PCT/EP2019/025111 filed Apr. 17, 2019, which claims the benefit of U.S. provisional application 62/660,913 filed Apr. 20, 2018 and which claims the benefit of U.S. provisional application 62/699,125 filed Jul. 17, 2018, all of which are incorporated herein by reference in their entireties.

FIELD

This application provides a hydraulic control system comprising an externally mounted pump. The system can be used for clutch control of an electronic limited slip differential.

BACKGROUND

Prior hydraulic control units suffer from high weight and high number of flow paths. At times, the flow paths are made via drillings which contribute contamination from burrs or other particulate that remain in the unit after drilling and cleaning is complete. A high number of flow paths also contributes: flow restrictions that slow the response time; increased machining cost; and increased part count to seal leak paths.

SUMMARY

The apparatus and methods disclosed herein overcome the above disadvantages and improves the art by way of a hydraulic control unit ("HCU") with an externally mounted pump. The system can be used, for example, for clutch control on a device such as a limited slip differential. Other devices having a hydraulically controlled piston in a cylinder can benefit from the disclosed HCU such as hydraulically-actuated clutch packs, dog couplings, gear couplings, power take-offs, transmissions, among others.

A hydraulic control unit comprises a central accumulator, a flow path connected to the accumulator, a reservoir sharing a fluid space with the accumulator, a pump, and a controllable valve. The flow path is integrally formed to comprise a first flow path and a second flow path. The pump is connected to the accumulator via the first flow path on a first side of the accumulator. The pump is further connected to the reservoir via an inlet flow path on the first side of the accumulator. The controllable valve is connected to the accumulator via the second flow path on a second side of the accumulator.

The configuration minimizes flow restrictions, increases response times of the affiliated hydraulically-controlled device, decreases machining costs, and decreases part counts. The integrations disclosed herein maximize space-savings.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Figure 1:
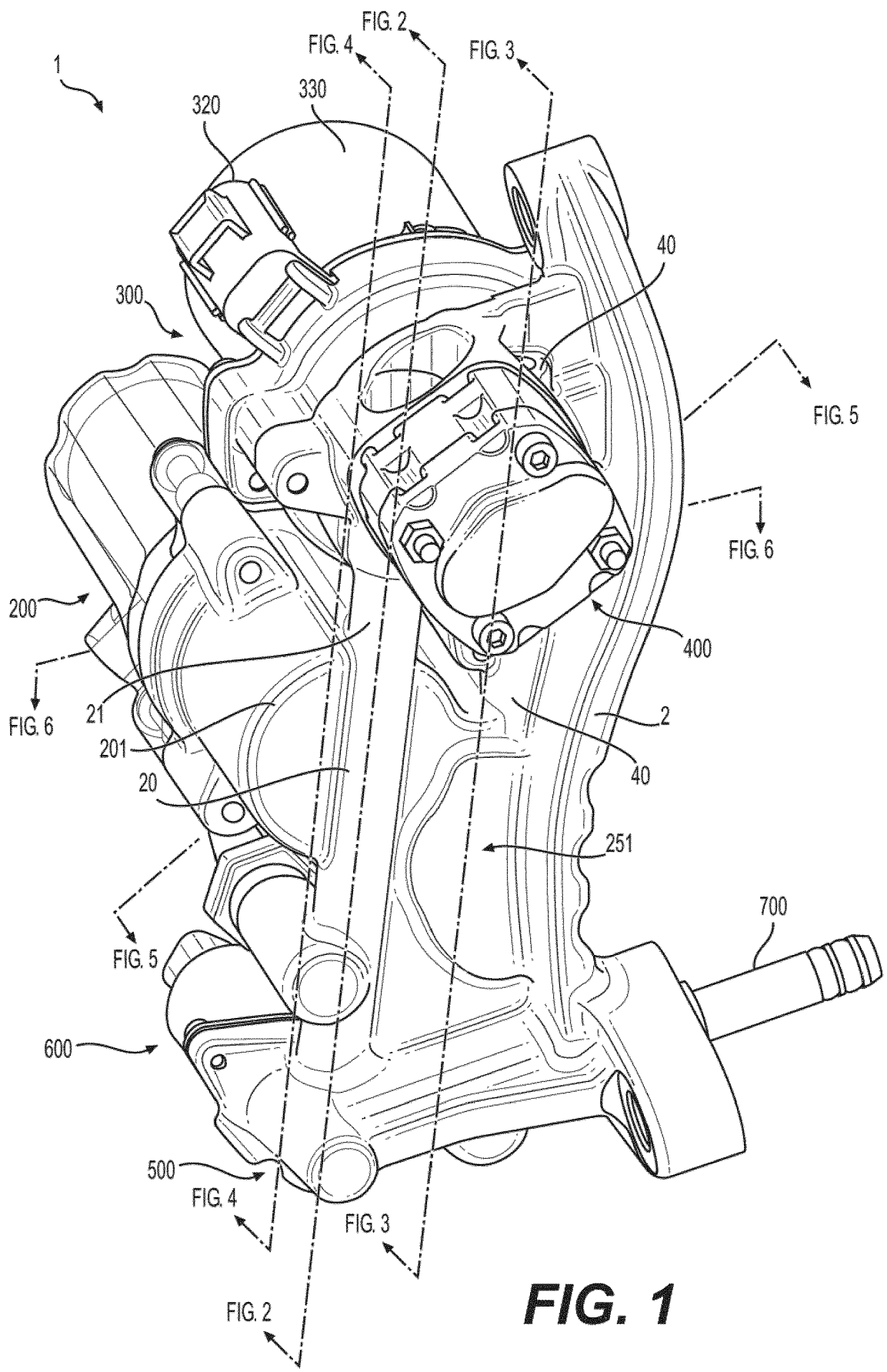
FIG. 1 is a view of a hydraulic control unit ("HCU").
Figure 2:
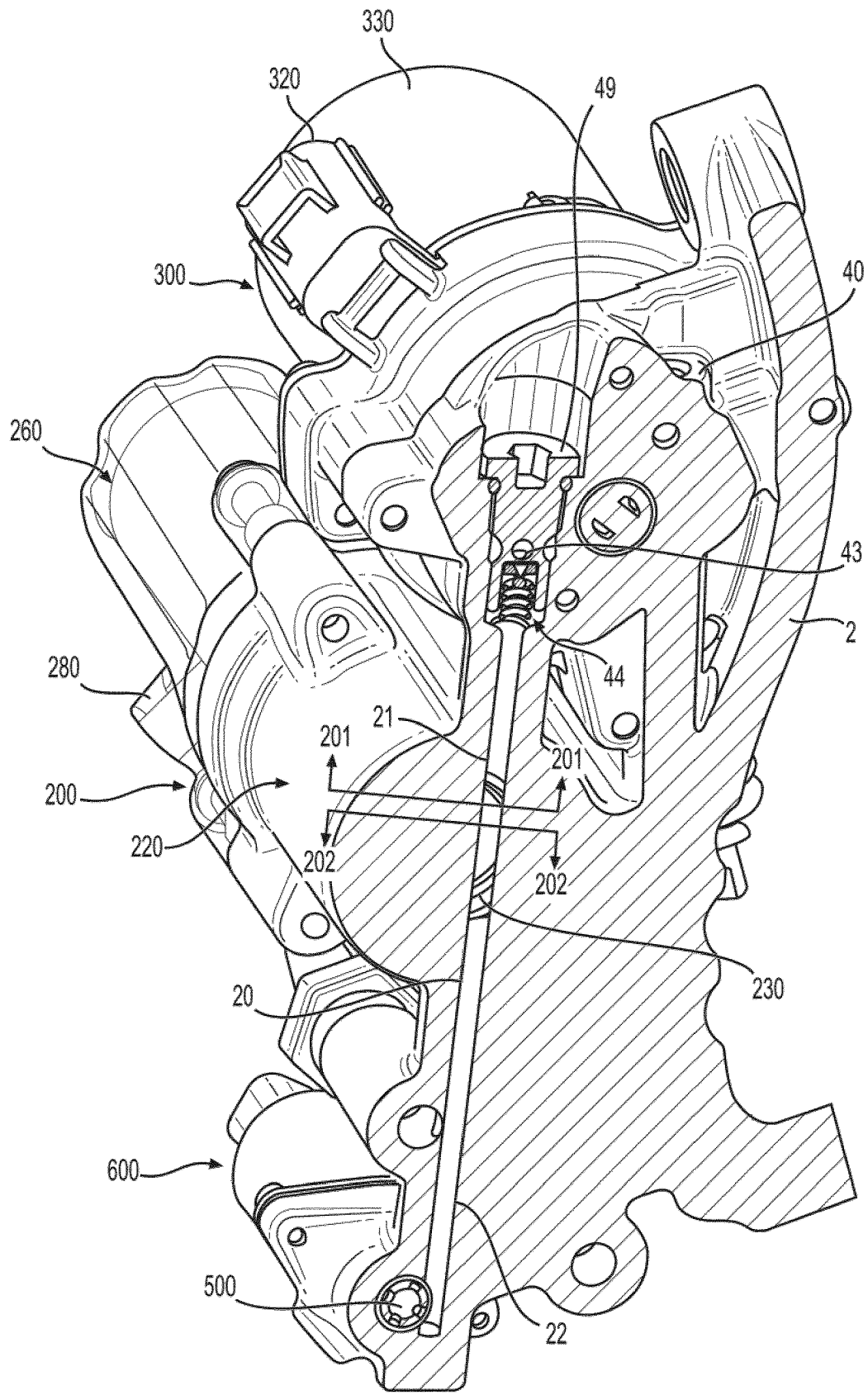
FIGS. 2-5 are cross-section views of the HCU.
Figure 3:
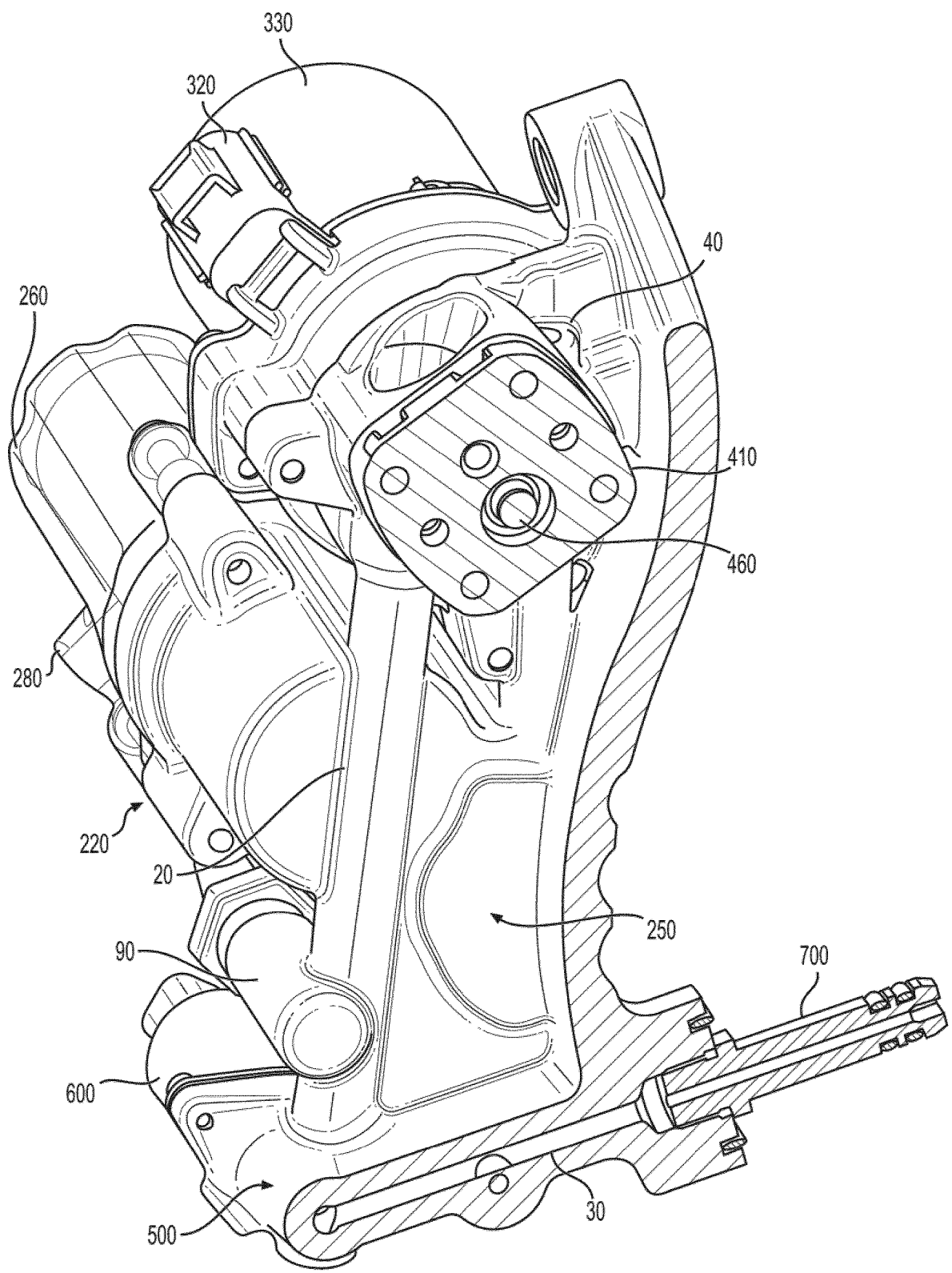
Figure 4:
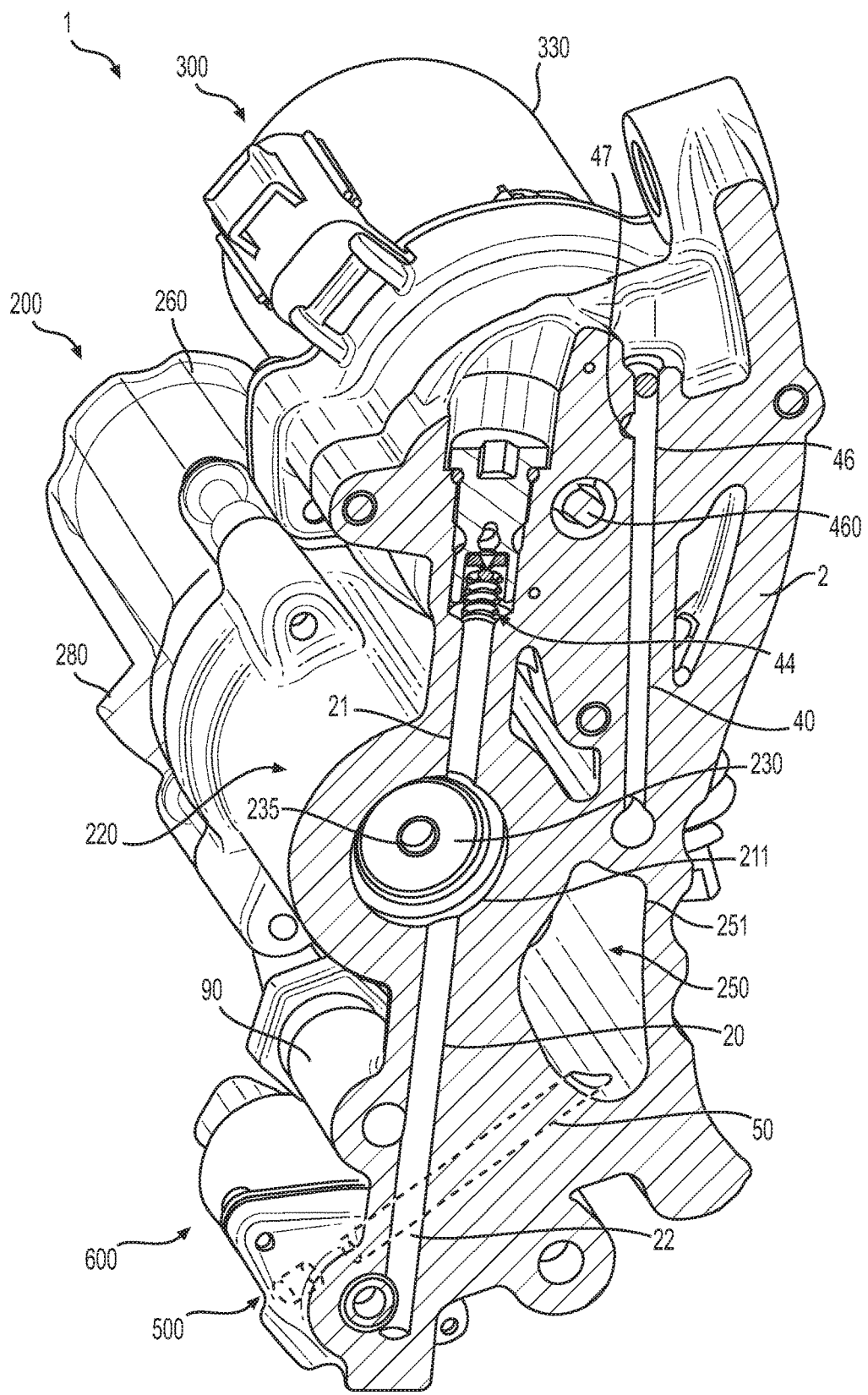
Figure 5:
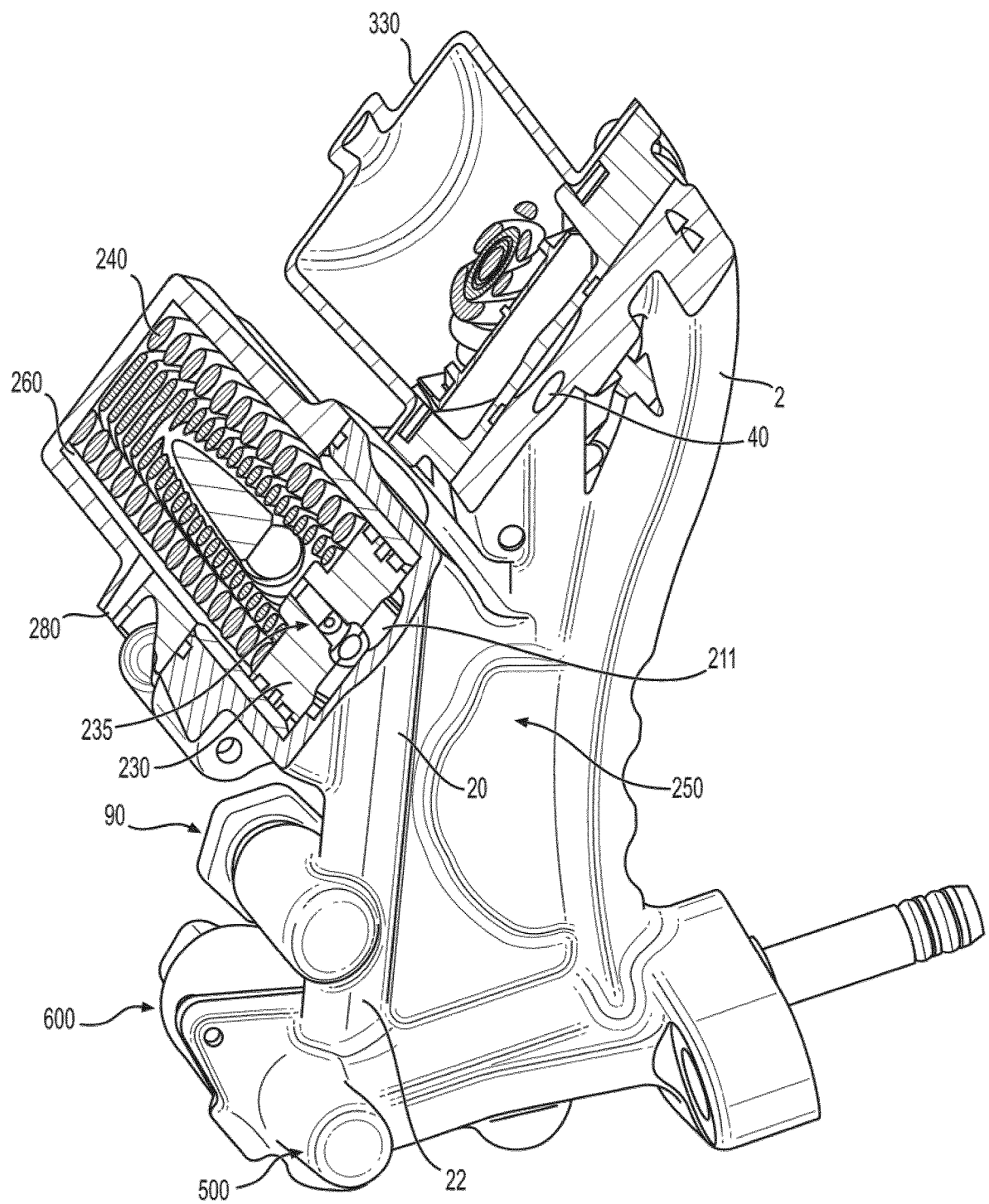
Figure 6:
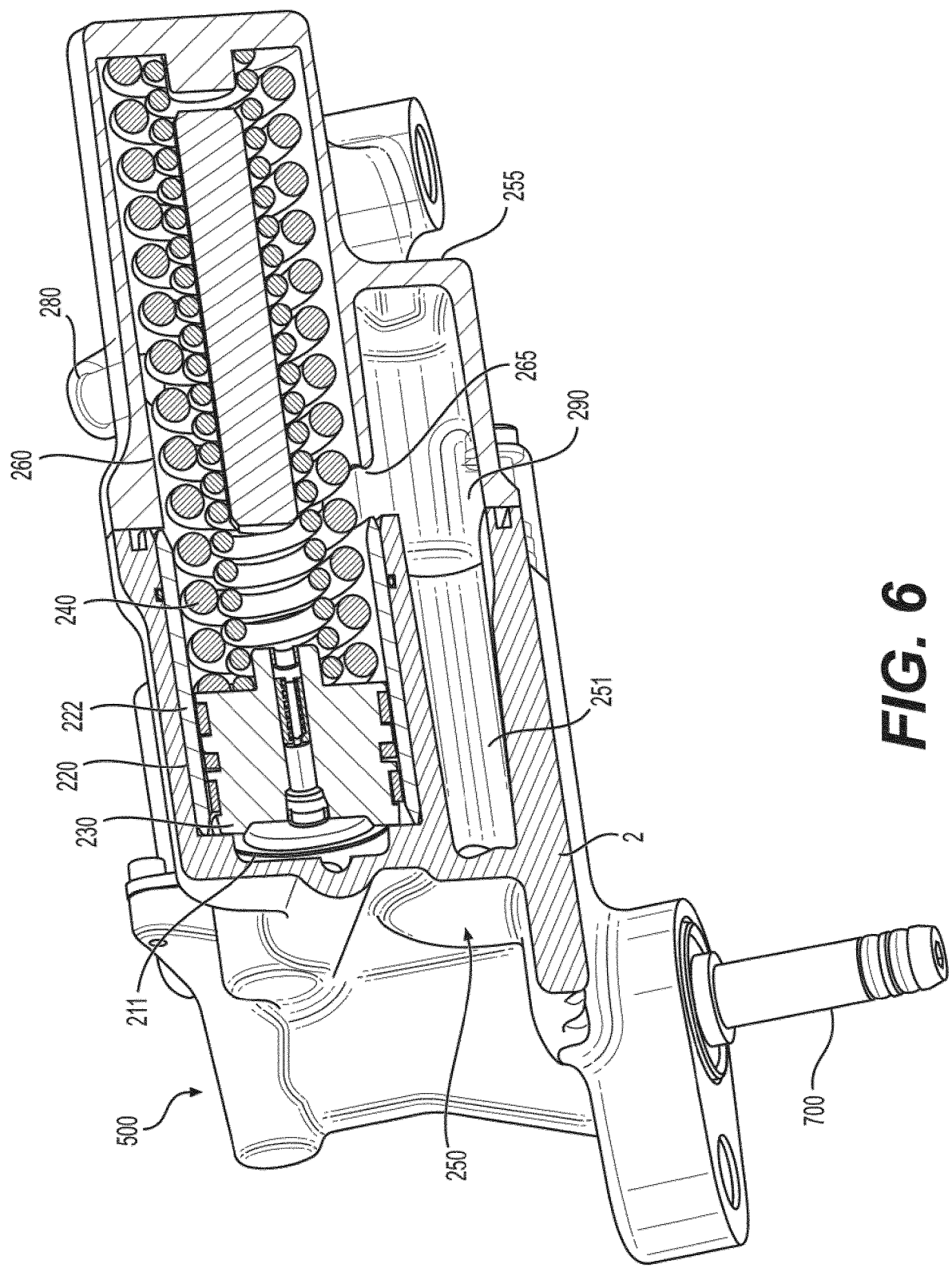
FIG. 6 is a cross section view of an accumulator of the HCU.
Figure 7:
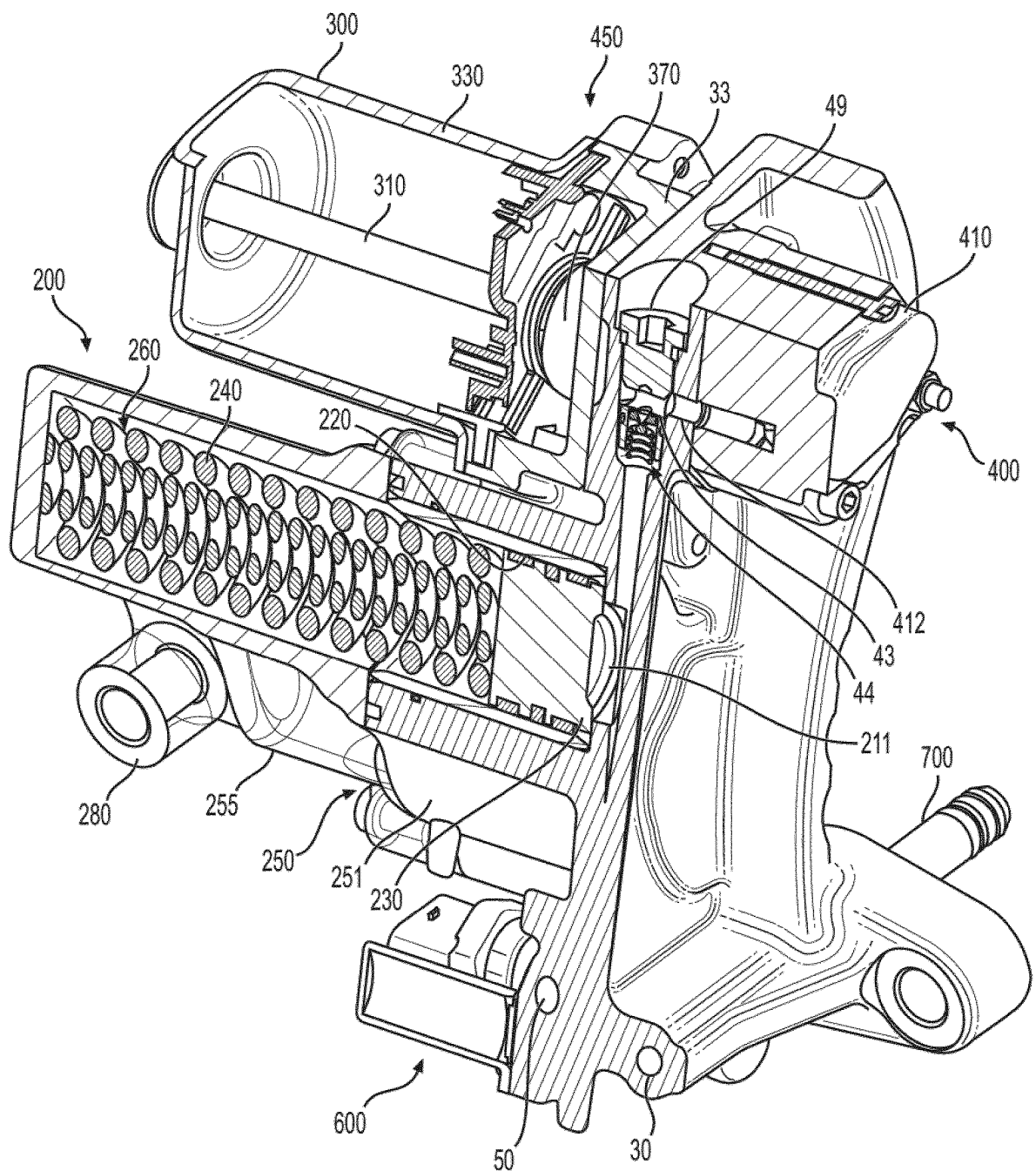
FIG. 7 is an additional cross section view through the HCU.

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

A hydraulic control unit ("HCU") 1 is shown comprising an integral housing section 2 formed by casting, molding, printing or the like. HCU 1 comprises a central accumulator 200, a flow path 20 connected to the accumulator 200, a reservoir 250 sharing a fluid space with the accumulator 200, a pump 400, and a controllable valve 500. The flow path 20 is integrally formed within the housing section 2 to comprise a first flow path 21 and a second flow path 22. The pump 400 is connected to the accumulator 200 via the first flow path 20 on a first side 201 of the accumulator 200. The pump 400 is further connected to the reservoir 250 via an inlet flow path 40 on the first side 201 of the accumulator 200. The controllable valve 500 is connected to the accumulator 200 via the second flow path 22 on a second side 202 of the accumulator 200.

The controllable valve 500 can comprise an on/off valve that is controlled by a solenoid 600. The solenoid can be connected to control the controllable valve 500 between an open position and a closed position. The closed position retains hydraulic fluid within the housing section 2 and within the flow path 20. The open position permits bidirectional fluid flow through a feed port 30 whereby the hydraulic fluid can enter a hydraulically-controlled device or return from the hydraulically-controlled device to the reservoir 250, as controlled by fluid pressures or the action of the pump 400. The feed port 30 is connected to the controllable valve 500, and the feed port 30 can further couple to, for example, a pick-up tube 700.

The pump 400 can comprise an externally mounted gear pump 410. Pump interface areas can be included in the housing section 2 so that the gear pump 410 can be affixed to the housing section 2. A cross-drilling or tooled area in a casting can constitute one such pump interface area and thereby form a first pump port 43. The first pump port 43 can intersect the first flow path 21 to fluidly connect the first fluid port 412 of the gear pump to the inlet area 211 of the accumulator 200. A like intersection with second fluid path 40 can connect that inlet flow path to a second pump port 47 fluidly connecting a second fluid port of the gear pump to fluid from reservoir 250.

The gear pump 410 can comprise two gears 440 meshed to rotate and thereby pump fluid. A motor 300 can be connected to the pump 400 to provide a motor-pump unit 450. The motor 300 can be connected to selectively operate the pump 400. To power the motor 300, an electronic plug 320 can be connected on the first side 201 of the accumulator 200.

Many aspects of the motor 300 are not shown, such as the electrification components. A central shaft 310 is shown, and this central shaft 310 can be connected to a drive shaft 460 of the gear pump 410 to rotate the gears 440. An electronic plug 320 can be included in motor housing 330 to power coils or other windings to permit rotation of the motor shaft 310, so that the gears 440 can rotate to pump fluid away from the reservoir 250 and towards the accumulator 200 and hydraulically-controlled device connected to feed port.

The pump 400 can be bolted to an exterior of the housing section 2 of the hydraulic control unit 1. A motor interface area 33 can be included on the housing section 2 to affix the motor 300 to the housing section 2. A passage can direct the central shaft 310 through a fluid-sealing area 370 that fluidly isolates the motor 300 from the hydraulic fluid of the HCU1. In some configurations, the fluid-sealing area 370 can comprise a coupling to transfer forces from the central shaft 310 to a coupling mechanism on the gear pump 410. The hydraulic control unit 1 can be coupled to a variety of devices such as a clutch or limited slip differential, among others.

By configuring an accumulator 200 centrally between the pump 400 and a controllable valve 500, the hydraulic control unit 1 can provide faster response times than prior HCUs, these prior HCUs having the solenoid and electrical components centrally located between an accumulator and a pump.

The disclosed design of HCU 1 has fewer 90 Degree bends, such as the one at controllable valve 500, and can be manufactured to comprise only 2 ball ports to plug drilled passageways. This minimizes leak paths, provides more direct flow paths, and increases response times over prior devices. So, the sequence of parts making up the HCU 1 yields exceptional results over prior art sequences of sub-components.

The hydraulic control unit 1 can comprise a filter in the form of a removable and replaceable cartridge in a filter location 46 in the inlet flow path 40. The filter can clean the hydraulic fluid as it traverses from the reservoir 250.

The hydraulic control unit 1 can further comprise a removable check valve 45 in a check location 44 in the first flow path 21. The removable check valve 45 can be between the motor 300 and the pump 400. The check valve 45 can be provided in a drilled passageway in the first flow path 21 between the pump 400 and the accumulator 200 and between halves of the motor-pump unit 450. The motor-pump unit 450 can comprise the gear pump 410 on a first end and a motor 300 comprising a drive unit on a second end, and a coupler 370 can connect the gear pump to the motor drive. The check valve 45 can be positioned to receive fluid from the pump 400, particularly from the first pump port 412. The check valve 45 can comprise, for example, a ball in a seat arrangement, among other customary designs for one way flow therethrough. The check valve can be positioned adjacent the coupler 370 and between the pump 400 and the motor 300.

The accumulator 200 can receive and store pressurized fluid from the pump 400 after the fluid passes through the check valve 45. The check valve can be configured to prevent backwards leaking from the accumulator 200 to the pump 400.

By pumping fluid through gear pump 410, the flow path 20 is filled with fluid. The controllable valve 500 is in a closed position by default, so fluid builds up and enters accumulator 200. Housing section 2 can comprise an accumulation area in the form of first fluid chamber 220 for accumulating fluid that is pumped but not released through the controllable valve 500. First fluid chamber can comprise a sleeve 222 surrounding piston 230. By integrating the accumulation area with the housing section 2, there are no leak paths between the first flow path 21 and the first fluid chamber 220. The accumulator 200 comprises a piston 230 in the first fluid chamber 220 and one or more spring 240 biased against the piston 230. One or more spring 240 can be biased against a wall in a spring chamber 260. The spring chamber 260 can be connected to the housing portion 2 during assembly. Spring chamber 260 can share fluid space with the reservoir 250.

When fluid is pumped by pump 400 into first fluid chamber 220, it pushes the piston 230 towards the wall of the spring chamber 260 and compresses the one or more spring 240. The one or more spring 240 coils and accumulates spring forces as the first fluid chamber 220 accumulates fluid 22. When the controllable valve 500 is moved to an "on" or open position by the solenoid 600, the one or more spring 240 releases its accumulated spring forces and pushes the piston 230 towards the accumulator inlet 211. Fluid exits through the controllable valve 500 in the open position. There are no leak paths between the first fluid chamber and the second flow path 22. The HCU 1 comprises minimal leak paths because the housing section 2 is formed with the flow path 20 connected via first flow path 21 and second flow path 22 to accumulator inlet area 211 and first fluid chamber 220. Little if any leaking occurs at the ends of flow path 20 (near controllable valve 500 or near plug 49.) And motor 400 can be drop-in assembled in housing section to minimize leak paths.

The spring chamber 260 can comprise a vent 280 to atmosphere to vent air or extreme fluid overpressure. A fluid feed 265 can be formed in the housing section 2 or in the reservoir cup 255 to permit fluid to leak down from the spring chamber 260 to the reservoir 250. A splash wall can be between the spring chamber 260 and the reservoir 250. Splash wall 290 can be in fluid communication with the spring chamber 260 so that if the HCU 1 is bounced or jarred, fluid can be retained in reservoir 250 and splash wall 290 can prevent splash back of fluid that has drained from spring chamber 260 to reservoir 250. The reservoir 250 can be optimized beneath the accumulator 200 to account for "roll angles" of the associated hydraulic device. So, the reservoir 250, including reservoir cup 255, can be sized and positioned to feed fluid to the inlet flow path 40 under operating conditions and to minimize instances where the fluid "rolls" away from the inlet flow path 40.

The accumulator 200 is arranged with respect to the reservoir 250 such that, when fluid is drawn from the reservoir 250 by the pump 400, the piston 230 retracts in the first fluid chamber 220 to compress the spring 240 in the spring chamber 260.

Should an extreme overpressure occur in flow path 20, a pressure relief valve 235 in piston 230 can release fluid from flow path 20 to spring chamber 260.

Fluid from the accumulator 200 can be released to a hydraulically controlled a device as by controlling controllable valve 500 connected to the second flow path 22 connected to accumulator 200. For example, a solenoid 600 or other control mechanism can be electronically controlled to open and close an on/off valve between the accumulator 200 and the hydraulically controlled device. A pick-up tube 700 or other porting or ducting can be connected between the controllable valve and the hydraulically controlled device.

Fluid returns to the reservoir by reversing flow through pick-up tube, when included, and through feed port 30. While the controllable valve 500 can be closed to capture fluid in flow path 20 or in the hydraulically controlled device and feed port 30, the controllable valve 500 can also be controlled to direct fluid to return path 50. Return path 50 connects between controllable valve 500 and first reservoir half 251 of reservoir. Because first reservoir half 251, return path 50 and mounting recess for controllable valve are integrally formed housing section 2, leak paths are minimized and fluid retention is maximized.

The HCU 1 can further comprise pressure sensors. A first pressure sensor 90 can be connected to the HCU 1 to sense pressure to the accumulator 200 from the pump 400. A second pressure sensor can be connected to sense the pressure to the hydraulically controlled device. The sensor data can be used to control the speed of the motor 300 and the opening and closing of controllable valve 500. The sensor data can also be used to control aspects of the hydraulically controlled device.

A housing for HCU can be formed by securing together housing section 2 and secondary housing halves. In lieu of using casting, molding, machining, or printing or the like can be used to form the housing section 2 or halves. Securement can be achieved, for example, by bolts. The housing section 2 can comprise the flow path 20 connecting the controllable valve 500 to the first fluid chamber 220 of the accumulator 200 and to the removable check valve 45. A connection such as first pump port 43 to the gear pump 410 can be included in the housing section 2. The gear pump 410 can be secured to the housing section 2. The controllable valve 500 can be installed in the housing section 2. The pick-up tube 700 can be connected to the housing section 2. The filter can be installed in the housing section. Housing section 2 can comprise only two drilled ports. When molding is used, only two tooling inserts are needed. The flow path 20 and the inlet flow path 40 are the only two drilled or tooled fluid pathways. A first reservoir half 251 of reservoir 250 can be formed by a pocket in the housing section 2. A second reservoir half can be formed by reservoir cup 255. Other fluid reservoirs and fluid connections can be part of the secondary housing halves and can comprise casting or tubing or piping. This limits contamination caused by burrs or drilling processes and improves the response time by making direct and less numerous fluid connections.

The first and second pressure sensors can be integrated into secondary housing halves. An electronic plug for the motor drive 300 can be integrated to the secondary housing half that is motor housing 330. So too, the spring chamber 260 and an external portion of the reservoir 250 comprising splash wall 290 can be a secondary housing half in the form of reservoir cup 255.

Alternatively, as much as possible, the housing section 2 is formed for drop-in assembly with adequate pockets to accommodate the pressure sensors, spring chamber, motor drive, electronic plug, and solenoid. These can be separate devices that are secured to the integrally formed first half of the housing. Lids, o-rings, fasteners, and like can be used to secure these to the pockets in housing section 2.

Other implementations will be apparent to those skilled in the art from consideration of the specification and practice of the examples disclosed herein.

What is claimed is:

1. A hydraulic control unit comprising:
   a central accumulator;
   a flow path connected to the accumulator, the flow path integrally formed to comprise a first flow path extending away from the accumulator to a first side of the hydraulic control unit and a second flow path extending away from the accumulator to a second side of the hydraulic control unit;
   a reservoir sharing a fluid space with the accumulator;
   a pump connected to the accumulator via the first flow path on the first side, the pump further connected to the reservoir via an inlet flow path on the first side;
   a motor comprising a drive unit on the first side; and
   a controllable valve connected to the accumulator via the second flow path on the second side,
   wherein the first flow path is between the drive unit and the pump.

2. The hydraulic control unit of claim 1, comprising a filter in the inlet flow path.

3. The hydraulic control unit of claim 1, wherein the pump comprises an externally mounted gear pump.

4. The hydraulic control unit of claim 1, further comprising a motor connected to selectively operate the pump.

5. The hydraulic control unit of claim 4, further comprising an electronic plug connected to power the motor, wherein the electronic plug is on the first side of the accumulator.

6. The hydraulic control unit of claim 1, wherein the accumulator comprises a piston in a first fluid chamber and a spring biased against the piston, the spring biased in a spring chamber, wherein the spring chamber shares fluid space with the reservoir.

7. The hydraulic control unit of claim 6, wherein the spring chamber comprises a vent to atmosphere.

8. The hydraulic control unit of claim 6, further comprising a splash wall between the spring chamber and the reservoir.

9. The hydraulic control unit of claim 6, wherein the accumulator is arranged with respect to the reservoir such that, when fluid is drawn from the reservoir by the pump, the piston retracts in the first fluid chamber to compress the spring in the spring chamber.

10. The hydraulic control unit of claim 1, further comprising a removable check valve in the first flow path.

11. The hydraulic control unit of claim 4, further comprising a removable check valve between the motor and the pump.

12. The hydraulic control unit of claim 1, further comprising:
    a removable check valve,
    wherein the removable check valve is in the first flow path.

13. The hydraulic control unit of claim 1, further comprising a solenoid connected to control the controllable valve between an open position and a closed position.

14. The hydraulic control unit of claim 13, further comprising a feed port connected to the controllable valve.

15. The hydraulic control unit of claim 1, further comprising a return path between the reservoir and the controllable valve.

16. The hydraulic control unit of claim 1, wherein the motor further comprises a coupler, and wherein the coupler is attached to rotate a portion of the pump.

17. A hydraulic control unit comprising:
    a centrally located accumulator;
    a flow path connected to the accumulator, the flow path integrally formed to comprise a first flow path extending away from the accumulator to a first side of the hydraulic control unit and a second flow path extending away from the accumulator to a second side of the hydraulic control unit;
    a reservoir sharing a fluid space with the accumulator;
    a pump connected to the accumulator via the first flow path on the first side, the pump further connected to the reservoir via an inlet flow path on the first side;
    a motor connected to selectively operate the pump;

a removable check valve between the motor and the pump; and a controllable valve connected to the accumulator via the second flow path.

18. A hydraulic control unit comprising:
a centrally located accumulator comprising a piston movable in a spring chamber;
a flow path connected to the accumulator, the flow path integrally formed to comprise a first flow path extending away from the accumulator to a first side of the hydraulic control unit and a second flow path extending away from the accumulator to a second side of the hydraulic control unit;
a reservoir fluidly coupled to the spring chamber;
a pump connected to the accumulator via the first flow path on the first side, the pump further connected to the reservoir via an inlet flow path on the first side;
a controllable valve connected to the accumulator via the second flow path; and
a return path between the reservoir and the controllable valve.

* * * * *